(12) United States Patent
Guigner et al.

(10) Patent No.: US 10,427,624 B2
(45) Date of Patent: Oct. 1, 2019

(54) FIBROUS AUTOMOTIVE CLADDING

(71) Applicants: AUTONEUM MANAGEMENT AG, Winterthur (CH); Delphine Guigner, Winterthur (CH)

(72) Inventors: Delphine Guigner, Winterthur (CH); Vipul Savaliya, Woodstock (CA)

(73) Assignee: AUTONEUM MANAGEMENT AG, Winterthur (CH)

( * ) Notice: Subject to any disclaimer, the term of this patent is extended or adjusted under 35 U.S.C. 154(b) by 223 days.

(21) Appl. No.: 15/522,538

(22) PCT Filed: Oct. 27, 2015

(86) PCT No.: PCT/EP2015/074865
§ 371 (c)(1),
(2) Date: Apr. 27, 2017

(87) PCT Pub. No.: WO2016/066640
PCT Pub. Date: May 6, 2016

(65) Prior Publication Data
US 2017/0313264 A1 Nov. 2, 2017

(30) Foreign Application Priority Data
Oct. 30, 2014 (EP) .................................. 14191184

(51) Int. Cl.
*B60R 13/08* (2006.01)
*G10K 11/168* (2006.01)
(Continued)

(52) U.S. Cl.
CPC .............. *B60R 13/08* (2013.01); *B32B 5/028* (2013.01); *B32B 5/18* (2013.01); *B32B 5/22* (2013.01);
(Continued)

(58) Field of Classification Search
CPC .......... B60R 13/08; B32B 5/028; B32B 5/18; B32B 5/22; B32B 7/12; B32B 2307/102; B32B 2605/003; G10K 11/168
(Continued)

(56) References Cited

U.S. PATENT DOCUMENTS 4,626,390 A * 12/1986 Li ............................ D01D 5/22
264/46.1
2004/0248490 A1 * 12/2004 Hyuga ...................... B32B 5/26
442/327
(Continued)

FOREIGN PATENT DOCUMENTS

| EP | 1775714 A1 | 4/2007 |
| WO | WO 03/074267 A1 | 9/2003 |
| WO | WO 2006/091031 A1 | 8/2006 |

OTHER PUBLICATIONS

International Search Report and Written Opinion prepared by the European Patent Office dated Jan. 5, 2016, for International Application No. PCT/EP2015/074865.

*Primary Examiner* — Forrest M Phillips
(74) *Attorney, Agent, or Firm* — Lewis Brisbois Bisgaard & Smith LLP; Craig W. Mueller

(57) ABSTRACT

Multilayer automotive trim part for noise attenuation comprising at least two fibrous layers (10, 30) and at least one air permeable intermediate film layer (20) between the at least 2 fibrous layers (10, 30), whereby the trim part is air permeable, and at least one of the fibrous layers (10, 30) is a mixture of fibers consisting of 10 to 40% of binder fibers, 10 to 70% of recycled fibers and 10 to 70% of self-crimped fibers and wherein the total amount of said fibers adds to 100% by weight.

17 Claims, 1 Drawing Sheet

(51) Int. Cl.
*B32B 5/02* (2006.01)
*B32B 5/18* (2006.01)
*B32B 5/22* (2006.01)
*B32B 7/12* (2006.01)

(52) U.S. Cl.
CPC .............. *B32B 7/12* (2013.01); *G10K 11/168* (2013.01); *B32B 2307/102* (2013.01); *B32B 2605/003* (2013.01)

(58) Field of Classification Search
USPC ........................................................ 181/294
See application file for complete search history.

(56) References Cited

U.S. PATENT DOCUMENTS

| | | | |
|---|---|---|---|
| 2005/0126851 A1 | 6/2005 | Ikebe et al. | |
| 2009/0250292 A1* | 10/2009 | Hayasaka | B60R 13/0815 181/290 |
| 2010/0065368 A1* | 3/2010 | Tazian | B29C 43/003 181/290 |
| 2012/0321849 A1* | 12/2012 | Richardson | B64C 1/40 428/138 |
| 2014/0371698 A1* | 12/2014 | Chang | A61F 5/445 604/333 |
| 2015/0118437 A1* | 4/2015 | Schulze | D06N 7/0063 428/95 |

\* cited by examiner

FIBROUS AUTOMOTIVE CLADDING

This application is a national stage application under 35 U.S.C. 371 and claims the benefit of PCT Application No. PCT/EP2015/074865 having an international filing date of 27 Oct. 2015, which designated the United States, which PCT application claimed the benefit of European Patent Application No. 14191184.2 filed 30 Oct. 2014, the disclosure of each of which are incorporated herein by reference.

TECHNICAL FIELD

The invention relates to a multilayer sound attenuating trim part for a vehicle, in particularly a trim part or cladding used for the interior of a vehicle, for instance as inner dash or as part of the floor covering or for the exterior of a vehicle, for instance as trim part or cladding in the engine bay area or as part of an under body trim component as well as to the method of producing such part.

BACKGROUND ART

Sound attenuation is an important factor in the design of a car. For sound attenuation fibrous materials are used in mass spring acoustic systems as well as in single or multi-layer absorbing systems.

The choice of a particular sound insulating material for a given application is determined not only by its ability to attenuate sound but by other considerations as well. These include cost, weight, thickness, fire resistance, etc. Well-known sound attenuating materials include felts, foams, compressed fibrous felt materials, glass wool or rock wool, and recycled fabrics including shoddy materials.

For instance U.S. Pat. No. 5,298,694 discloses an acoustical insulating web to be used as an absorbing layer, comprising melt-blown microfibers and crimped bulking fibres in a weight ratio of about 40:60 to about 95:5. The crimped bulking fibers disclosed are mechanically crimped fibers or thermally crimped fibers. These types of crimp are mainly used to aid the production process of the fibrous material felt layer, however they do not have a prolonged effect on the product performance during its use.

EP 934180 A discloses a multilayer acoustic trim part with at least two layers whereby the top layer is compressed to form a micro porous stiffening layer having a total airflow resistance of between Rt=500 Nsm$^{-3}$ to Rt=2500 Nsm$^{-3}$ and an area weight of between 0.3 kg/m$^2$ and 2.0 kg/m$^2$. The part showing sound absorption properties For the parts described in this and similar patents as well as found in cars, the layers are normally formed together to obtain an overall multilayer construction. One way to produce a layer which is part of the multilayer is to distribute the fibers in such a way that the area weight (mass per unit area) of the layer remains constant. In this case, if the layers are put together on top of each other through the forming process, the overall area weight of the multilayer is still constant, while the overall density of the multilayer is varying from point to point. In particular, in areas where the layers are compressed to obtain a lower thickness on the part, the overall density is higher than in areas where the layers are less compressed to fill a space with higher thickness. For this reason and for this type of parts, high overall density of the multilayer is generally associated to low thickness and low overall density of the multilayer is generally associated to high thickness.

It is estimated that up to 30% of the total area of parts forming the state of the art is not contributing to the sound absorption of such parts due to local areas with high density at low thickness rendering the product near to impervious to air in those areas of the part.

The estimation of 30% weak areas comes from analysis of typical packaging space, i.e. available volume to be filled by acoustic parts in a vehicle. For such parts, the range of thicknesses is generally between 5 and 60 mm, but the distribution of thickness and the extreme values can vary between different cars and parts. For typical dash inner acoustic parts that are in majority of absorptive type, the thickness distribution found is roughly as follows: thickness distribution below 7.5 mm 19%, with a thickness distribution between 7.5 and 12.5 mm 27%, with a thickness distribution between 12.5 and 17.5 mm 16%, with a thickness distribution between 17.5 and 22.5 mm 13%, with a thickness distribution between 22.5 and 27.5 mm 20%, and with a thickness distribution above 27.5 mm 5%.

These data show that the thicknesses below 12.5 mm highly contribute to the overall area of the part (about 45%). In these areas, the material is heavily compressed and this has a negative impact on the acoustic performance, in particular for thicknesses below about 8 mm. The location of part of these low thickness areas is at the edges and around the cut-outs and therefore less important, however a good part of the 45% is strongly contributing to the performance. For these considerations, it is estimated that roughly 30% of the area of a typical part has characteristics which are especially critical for the overall performance.

Another important issue is that currently used fibrous material is unable to achieve sufficient thickness at low density to address part thickness requirements. Therefore weight is added to obtain the required thickness, however at the cost of the increasing overall weight of the part. Adding weight has in turn a negative effect on the acoustic performance of the lower thickness areas where the material is heavily compressed. Not only the packaging space available is relatively limited and influencing the performance of the part, but in addition the increase of weight limits even more the performance in these areas. Overall, due to the material currently used and the problem just described, approximately up to 30% of the area is minimally or not contributing to its overall acoustic performance.

It is therefore the object of the current invention to further optimise the multilayer absorbing products of the state of the art, in particular to further optimise the overall acoustic performance of the part.

SUMMARY OF INVENTION

Figure 1:
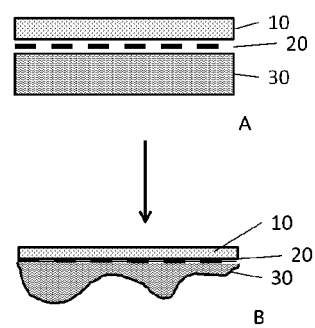
FIG. 1A is a schematic of the product.
FIG. 1B is a schematic of the product moulded into a 3 D trim part.

The objective is obtained by a multilayer automotive trim part for noise attenuation comprising at least 2 fibrous layers and at least one air permeable intermediate film layer between the at least 2 fibrous layers and whereby the trim part is air permeable, characterized in that at least one of the fibrous layers is a mixture of fibers consisting of 10 to 40% of binder fibers, 10 to 70% of recycled fibers and 10 to 70% of self-crimped fibers and wherein the total amount of said fibers adds to 100% by weight.

In particularly by the combination of the material as claimed, it is possible to obtain the higher thicknesses required and to fill the packaging space over a larger range of thicknesses using less material.

Surprisingly, the area with the lower thicknesses still show acoustic absorption, increasing the acoustic absorbing area of the part to almost 100%. With the material according to the invention an increase in initial thickness at reduced density could be achieved, therefore a reduction in weight at same thickness can be achieved. This is an further advantage for the car maker as the part becomes lighter in weight, having a direct positive effect on the fuel consumption and the CO2 footprint of the car.

Surprisingly the initial resilience of the material is kept intact during the production and even at prolonged use of the material. This is beneficial as the trim parts or cladding made with the material are normally in the car throughout its lifetime, the product will therefore maintain its initial performance longer.

Preferably the air flow resistance of the top layer and the intermediate layer together represents at least 55% of the total AFR of the complete multilayer, preferably between 65% and 80% of the total AFR of the complete multilayer. Preferably at least the layer facing towards the source of noise, for instance the passenger compartment, is compressed to form a micro porous stiffening layer having a total airflow resistance Rt of between 400 and 3000 $Nsm^{-3}$, preferably between Rt=500 $Nsm^{-3}$ to Rt=2500 $Nsm^{-3}$ and an area weight of between 0.3 $kg/m^2$ and 2.0 $kg/m^2$.

Due to the combination of materials including the crimped fibers, it is possible to obtain a 3 dimensional shaped part with an optimised acoustic performance over almost the whole thickness profile of the part.

The Fibrous Layers

The trim part comprises at least 2 fibrous layer of which at least one of the layers is made from a mixture of fibers consisting of 10 to 40% of binder fibers, 10 to 70% of recycled fibers and 10 to 70% of self-crimped fibers.

The other layer preferably comprises at least a mixture of 10 to 40% binder fibers and 10 to 70% recycled fibers. However this layer might also benefit from added self-crimped fibers and or synthetic fibers.

Self-crimped fibres are fibres with two sides, arranged such that one side shrinks differently from the other side and thereby induced a shaping of the filament away from the straight line, for instance in the form of spiral, omega or helical. However in most cases the shape is not necessarily a regular structure: irregular 3 dimensionally shaped versions are having the same advantage.

Self-crimped fibers can be made by exploiting morphology differences across the fiber either by utilizing the inherent morphology differences of two different polymers or by creating a morphology difference in a homopolymer by means of additives or process manipulation. Methods to achieve this include but are not limited to bicomponent technologies such as side by side and eccentric sheath core, which exploits molecular weight and/or stereochemistry differences of each component. Similar effects can be achieved by manipulating other melt spinning process variables (i.e. melt viscosity) that cause a differential in the orientation level across the fiber diameter, while using a homopolymer. Additionally, polymer additives like cross linkers or branching agents could also be used to create a similar effect.

A pre-requisite for self-crimping is a certain crimping potential created by differences in shrinkage, shrinking power and modulus of elasticity of the two fiber components.

A mechanical crimp might be used to further enhance the fiber crimp and the shape formed, for instance by including a stuffer box treatment or a saw tooth gear treatment.

Self-crimped fibers differ from mechanically crimped fibers in a way that they obtain the crimping capacity during the spinning of the fiber as an intrinsic feature of the fiber. This intrinsic self-crimp is less likely to be lost during further production process steps or later use of the material. The crimp in self-crimped fibers is permanent.

Fibers that have a crimping potential that is induced later by an additional process for instance a heating step, are defined as having latent crimp. This crimp can also be obtained by the same type of differences as previously disclosed. Preferably the self-crimped fibers are in their final crimped status, and no further crimping is induced by later processes. To have the crimped status from the beginning of the production of the automotive trim part, shows a better mixing of the fibers, a more homogenous fibrous mat after carding or airlay, and less crimp of the fibrous mat during moulding therefore the blank size can be estimated more precisely. While inducing crimp during thermal moulding of the trim part, would result in a heavy crimp of the fibrous mat, causing a movement of the fibers during moulding, which might result in faults in the final part. Depending on the 3 D shape of the trim part, there is no benefit in a too late initiation of the shrinkage of the fibers.

The advantages of using a self-crimped fiber rather than a mechanically crimped fiber are manifold. For the invention as disclosed the most important advantages are that the fiber is in the crimped status from the beginning of the production of the fibrous layers. The crimped status in the form of a randomly 3-dimensional shaped fiber is the preferred status of the fiber. Surprisingly, the fiber stays in this preferred shape during the whole production as well as during the lifetime of the trim part.

Mechanically crimp on its own is less strong and will lose its' properties over time. Mechanically crimped fibers will flatten out over time, losing the resilience and loftiness, making the trim part to fail over time in its purpose.

The self-crimped fiber is preferably a side by side conjugate fiber. Preferably the conjugate material is chosen such that there is a difference in viscosity causing an inherent self-crimping in the fibre. However other types of conjugate fibers that show a self-crimping as defined might be chosen as well.

Preferably, the self-crimped fibers are made of one or a combination of: polyamide (nylon) preferably polyamide 6 or polyamide 6,6, in short PA; polyester and or its copolymers, for instance polyethylene terephthalate in short PET; polybutylene terephthalate, in short PBT, or polyolefin, for instance polypropylene, (PP) or polyethylene (PE) or a combination of a polymer and its copolymer as mentioned, for instance a combination of polyethylene terephthalate and copolyethylene terephthalate PET/CoPET.

Self-crimped fibres are fibres with two components arranged such that one component has a shrinking behaviour different from the other component and thereby induce a shaping of the filament away from the straight line, for instance in the form of spiral, omega or helical. However in most cases the shape is not necessarily a regular structure: irregular 3 dimensionally shaped versions are having the same advantage. In self-crimped fibers the crimp is permanent.

The use of polyesters is most preferred as they have a good record of recycling. The polymers used for the self-crimped fibers or the binder fibers can be virgin or coming from recycled resources, as long as the material requirements are given.

Preferably the self-crimped fibres have an overall round cross section, more preferably with a hollow core, also known as hollow conjugate fibers. However, other cross-sections known in the art to make conjugate self-crimped fibers can be used as well. The self-crimped fibers might have 2 or multiple hollow cavities in the length direction of the fiber.

The 2 sides, components or polymers should be distributed in the filament string such that a difference in shrinkage is given. The maximum crimp may be developed when the fibers are comprised of equal parts of each component and the components were separated and located on opposite sides of the fiber.

The staple fibre length of self-crimped fibers used is preferably between 32 and 76 mm. The fiber is preferably between 2 and 20 dtex, more preferably between 2 and 10 dtex.

Overall the use of the self-crimped fibers enhances the evenness of the material layer obtained by for instance carding methods or more preferred air lay methods. The natural tendency of the self-crimped fibers to go back to a random curled form gives the fibers an additional resilience. In particularly the shoddy material is not clumping again during processing and is better spread throughout the layer. The permanency of the crimp prevents the loss of the crimp during processing.

Surprisingly the material as claimed can be thermoformed more precisely in a 3 D shape and in addition the resilience of the material is not substantially reduced during moulding, showing that the fibers are less prone to deterioration during the moulding process of the actual part. In addition, the material keeps its resilience during use, ergo the initial thickness obtained directly after moulding is maintained longer.

The binder fibers for any of the fibrous layers can be one of a mono-component fiber or bi-component fiber made with at least one of the following materials, polyester, in particularly polyethylene terephthalate, polyolefins, in particularly Polypropylene or polyethylene, polylactic acid (PLA) or polyamide (PA) in particularly polyamide 6 or polyamide 6.6. The binder fibers are preferably between 10 and 40% by weight of the total fibers for any of the fibrous layers. At least one of the components of the binder fibers is able to melt and or soften at a lower melting temperature than the melting temperature of the self-crimped fibers. Preferably a combination of the polymer polyethylene terephthalate and its copolymer of is used.

The recycling fibers are preferably shoddy cotton, shoddy synthetic, shoddy polyester or shoddy natural fibers, whereby the shoddy type is defined by having at least 51% by weight of the material included, 49% can be fibers from other sources. So for instance, a shoddy polyester contains at least 51% by weight of polyester based materials. Alternatively, the shoddy material can be a mixture of different synthetic and natural fibers, whereby not one type is prevailing. The other sources for the additional material can be for instance biofibers like hemp, flax or cocos, cotton or synthetic fibers or even reused material of cut off coming from the same of similar production line making fibrous trim parts. In certain cases also a small amount of recycled foam cuts might be included.

The fibrous layer not including the crimped fibers, the layer facing towards the source of noise, might include other natural or synthetic types of fibers common in the industry, for instance wool, abaca, polyolefin, for instance polypropylene or polyethylene, or polyester, for instance polyethylene-terephthalate (PET) or a mixture of such fibers. This layer might also include ultrafine fibers in the range from 0.5 to 2 dtex.

Preferably the fibrous layers are having the same or similar mixture of fibers. The at least 2 fibrous layers may be compressed differently to form layers with different properties. They may differ in at least one of: stiffness, density, air flow resistance or fibre mixture, or a combination of these properties, to further optimise the absorbing properties of the trim part.

In a preferred embodiment the trim part is to be placed in a car to cover a vehicle panel to reduce noise. The side of the trim part that is facing in the direction of the passenger compartment, away from the vehicle panel (the top fibrous layer), may have a higher stiffness than the side that is facing in the direction of the vehicle panel (the second fibrous layer). This side is preferable following the body in white and has loftier properties.

Preferably, the at least 2 fibrous layers and the intermediate film layer together have an overall density of between 20 and 460 kg·m$^{-3}$. The variable density can be achieved preferably by compression of the at least 2 fibrous layers and the intermediate layer during the moulding of the trim part to form the required shape, resulting in a product that is air permeable and functions as an acoustic absorbing trim part that is light weight and keeps its structure during the lifetime of the product.

Surprisingly the combination of material in at least one of the fibrous layers according to the embodiments further optimises the acoustic performance. It enables to reduce weight and still obtain the variable thickness needed for this types of automotive trim parts, normally in the range of between 4 and 30 mm, preferably up to 35 mm. However depending on material of the at least one layer up to 40-50 mm total thickness can be achieved with at least one layer containing self-crimped fibers.

The top fibrous layer, the layer facing away from the source of noise, for instance the body in white, has preferably an area weight of between 250 and 1800 gsm (grams per square meter), preferably between 400 and 1100 gsm.

Preferably the thickness of the top layer is between 1 and 10 mm in the final trim part. Preferably this layer has a more constant thickness.

The second layer facing towards the source of noise, for instance the body in white, has preferably an area weight of between 250 and 1500 gsm, more preferably between 300 and 800 gsm.

Preferably the thickness of the second layer is between 2 and 60 mm in the final trim part.

The overall area weight of the at least 2 fibrous layers is preferably between 800 and 2500 gsm, preferably between 1000 and 2000 gsm.

The Intermediate Layer

The air-permeable intermediate film layer is either a single layer film or a multilayer film. The film may be cast or blown film preferably. The intermediate film layer preferably has a thickness of between 5 and 100 gsm, more preferably between 8 and 50 gsm, even more preferably between 8 and 40 gsm.

The film can be made from at least one of the following polymers: copolymer or polymer of acetate, like Ethylene Vinyl Acetate (EVA), copolymers of acrylate for instance Ethylene Acrylic Acid (EAA), a polyolefin for instance a polyethylene (PE) based polymer, like linear density polyethylene (LDPE), linear long density polyethylene (LLDPE) or a metallocene linear long density polyethylene (mLLDPE) or derivatives, or a multilayer film, preferably a combination of a polyethylene based copolymer film covered with an adhesive EAA layer at least at one side.

The intermediate layer is air-permeable at least in the final product, enhancing the air flow resistance of the trim part. Depending on the process chosen for laminating the layers and moulding the final part the film might be air permeable from the beginning, or might become air permeable during the production of the part. If the film is made air permeable in a separate production step, it should be chosen such that the film enhances the air flow resistance of the part.

A preferred process is opening the film layer during the moulding of the trim part using steam pressure to obtain an air permeable layer with an air flow resistance that is beneficial for the overall acoustic performance of the part. By opening the film during the final production step of the trim part the AFR properties of the film may be tuned to the required needs.

Preferably the intermediate layer is the layer with the highest air flow resistance. Preferably the air flow resistance of the thin intermediate layer is between 500 and 2500 $N \cdot s \cdot m^{-3}$ in the final product independent of the process chosen.

The air permeable intermediate layer can alternatively be one of a nonwoven scrim, a hot melt layer, a gluing web or adhesive layer that after moulding has the same level of air flow resistance as would be achieved with the film material.

In some cases, the second layer can be peeled off from the construction, while the first layer and the intermediate layer are more difficult to separate.

FIG. 1 is showing schematically the set-up of the product according to the claim with the at least 2 fibrous layers 10 and 30 and the thin intermediate film layer 20. Blanks of the fibrous layers and the intermediate layer are stacked as indicated in figure A and the stack of materials is moulded to form a trim part with a 3 dimensional shape shown as an example in figure B. During the moulding the top and/or bottom fibrous layers are compressed and the fibers are bound to set the final shape of the part.

Although the top layer is shown as a straight layer in practice this layer might also be curved or formed in a 3 D shape.

Optionally as part of the process the intermediate film layer might become air-permeable, for instance by forming micro perforations or by the process of melting and solidifying of the material. Although layer 10 after moulding is relatively constant in its final thickness, slight variations in thickness might be given. In this example, the lower layer 30 has a more pronounced 3 dimensional shape to enable a good fit to the body-in-white of the car. Preferably, at least the layer directed to the body in white of the car comprises crimped fibers as claimed.

An example of a part according to invention can be as follows:
The top layer 10 is facing away from the noise source and is made of a first fibrous layer with an area weight of 750 gsm comprising 18% of PET/CoPET bicomponent fibers as binder fibers and 82% of recycled fibers, preferably a shoddy cotton.
The air permeable intermediate layer 20 is a film layer with a thickness of 20 gsm. The film layer is made permeable during the steam moulding process of the part, thereby fine tuning the air flow resistance of the film using steam pressure.
The second fibrous layer 30 is a fibrous layer with an area weight of 550 gsm consisting of 18% by weight of PET/CoPET bicomponent fibers as binder fibers and 40% by weight of PET self-crimped fibers and 42% of recycled fibers, preferably cotton shoddy.

Giving an overall area weight of around 1300 gsm.

An comparative example according to the state of the art has a top layer of 18% bicomponent fibers as binder fibers and 82% of shoddy material with an area weight of 750 gsm, roughly the same film layer and a second fibrous layer of the same material as the top layer, however at 1100 gsm to compensate for thickness requirements of the trim part. As this material does not achieve the required initial thickness to fill the maximum thickness areas of the part at a lower area weight.

Hence the part has a total area weight of 1850 gsm.

Measurement of the acoustic absorption of a 3 dimensional part showed an overall increase in the absorption properties over the whole range of frequency, in particularly it was noticed that a better performance could be achieved in areas of the part with a the thickness between 4 and 12.5 mm.

Figure 2:
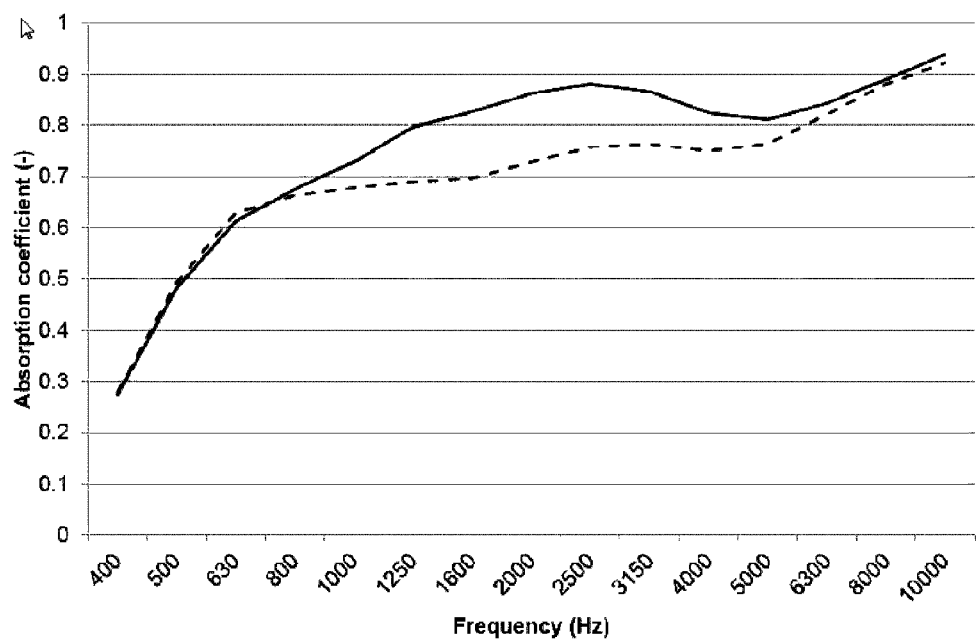
FIG. 2 shows a simulation of the acoustic performance for the trim part.

FIG. 2 is showing a simulation of the acoustic performance for the same trim part as disclosed optimised according to the invention as claimed. The absorption is based on actual measurements in an Alpha Cabin of flat samples and on the thickness distribution as mentioned in the background section. The absorption of a part according to the state of the art is shown in dotted line, while the absorption of a part according to the invention is shown in continuous line. The better acoustic performance for the part according to the invention is specifically linked to the performance in the areas of low thickness (high density) which is better for the part according to the invention because of the optimal overall AFR.

The multilayer part according to invention can be used as an interior trim part for instance as an inner-dash, or hush panel, as part of an interior flooring system, as an acoustic cladding, or as an engine bay trim part, for instance a hood liner, or outer-dash or as an outer or inner wheel arch liner.

A multilayer acoustic trim part according to the invention may further comprise additional layers such as a covering scrim layer, an acoustic scrim layer, a decorative top layer, for instance a tufted or nonwoven carpet layer. To keep the benefit of the acoustic attenuation these additional layers should be air permeable at least on the side directed to the noise source The Production of the Trim Part In the following, a possible production process will be explained in more detail. However, a skilled person might also be expected know how to use alternative processes to come to a similar result.

The different fibres are blended in the advantageous combination according to the teachings of the invention and the properties needed for the specific part, such that the fibers are evenly blended throughout the material formed. The blended fibres are formed in a mat or bat, by known technologies available on the market. Preferably by using a card or garnet, which gives a more orientated fibre material or by using an airlay process, for instance using a Rando-Webber or other known air lay machine, which gives a more random laid web or mat. The thus obtained web or mat can be further processed in a continuous process. If there is a need for later processing the web or mat formed can be consolidated for instance in a thermal process step or by using needling. Needling is not preferred for the fibrous webs or mats containing the self-crimped fibers, this has a negative impact on the loftiness and resilience of the layer obtained.

The product can be made by using hot and/or cold moulding processes. An example of such a process can be a combination of preheating the material in a hot air oven followed by a cold moulding step to obtain the 3 D shaped trim part. Alternatively the material is heated directly in the mould for instance by a hot fluid, like hot air or steam, to obtain a consolidated part. In particular, the use of steam is preferable if the film is to be made air permeable during the moulding step.

Measurement Background

The AFR is measured according to ISO 9053, using the direct airflow method (method A).

The air flow resistance (AFR) is the AFR as measured on a local area of the trim part. It is clear to a skilled person that an average over a certain small area will do as well to follow the teachings of the invention as disclosed, as the measurement for density and AFR are done on an area rather than a single point cross section.

Due to the typical shape of the parts and to the materials used, both the overall density and the overall AFR are variable over the part's surface. In order to define the minimum area to measure those quantities, the ISO 9053 defines a minimal circular area having a diameter of 95 mm that must be used. However as the 3D shape of the parts is particularly marked in some cases, when necessary the skilled person can deviate from the limit of the norm and measure samples with a smaller circular area having a diameter of not less than 75 mm, provided that the tool for the measurement of the AFR is adapted to provide a proper airflow through such local area of the part. For such a sample, it is advised that the thickness variation over the sample's surface is kept within a range of around 20%. For example it is acceptable to measure a sample having a thickness of 5 mm with local deviation between 4 and 6 mm (and not outside this range), or a sample having a thickness of 10 mm with local deviations of between 8 and 12 mm (and not outside this range). Otherwise due to the shape of the part, for example due to lack of perfect planarity, and due to variability of the material, the measurements would not be meaningful. For example the AFR would be linked to a limited area of the sample where the thickness is lower compared to the average thickness of the sample and therefore would not be representative of the complete sample.

Air-permeable is defined as having an air flow resistance under 8000 N·s·m$^{-3}$ for sake of simplicity. Air impermeable is defined as having an air flow resistance equal to or above 8000 N·s·m$^{-3}$. Above 8000 N·s·m$^{-3}$ the air flow resistance that might exist is at least insufficient to have a major impact on the acoustic absorbing performance of the part.

What is claimed is:

1. A multilayer air permeable automotive trim part for noise attenuation comprising:
    at least two fibrous layers;
    at least one air permeable intermediate film layer between the at least two fibrous layers; and
    wherein the at least one of the fibrous layers is a mixture of fibers consisting of 10 to 40% of binder fibers, 10 to 70% of recycled fibers and 10 to 70% of self-crimped fibers, and wherein the total amount of fibers adds to 100% by weight.

2. The automotive trim part according to claim 1, wherein the air flow resistance of the fibrous layer facing away from the noise source and the intermediate film layer together represents at least 55% of the overall AFR of the multilayer, preferably between 65% and 80% of the overall AFR of the multilayer.

3. The automotive trim part according to claim 1, wherein the AFR of the intermediate film layer is higher than the AFR of the at least two fibrous layers.

4. The automotive trim part according to claim 1, wherein at least one layer facing towards the source of noise is compressed to form a micro porous stiffening layer having a total airflow resistance $R_t$ of between 400 and 3000 Nsm$^{-3}$.

5. The automotive trim part according to claim 1, wherein at least one of the fibrous layers comprises a mixture of fibers consisting of 10 to 40% by weight of binder fibers, 10 to 70% by weight of recycled fibers wherein the total amount of fibers adds to 100% by weight.

6. The automotive trim part according to claim 1, wherein at least one of the fibrous layers comprises a mixture of fibers consisting of 10 to 40% by weight of binder fibers, 10 to 70% by weight of recycled fibers, and 10 to 70% by weight of synthetic fibers, wherein the total amount of fibers adds to 100% by weight.

7. The automotive trim part according to claim 1, wherein the second air permeable intermediate film layer is one of a single layer film or a multilayer film.

8. The automotive trim part according claim 5, wherein the film is made with at least one of the following polymers: copolymer or polymer of acetate, like Ethylene Vinyl Acetate (EVA), copolymers of acrylate for instance Ethylene Acrylic Acid (EAA), a polyolefin for instance a polyethylene (PE) based polymer, like linear density polyethylene (LDPE), linear long density polyethylene (LLDPE) or a metallocene linear long density polyethylene (mLLDPE) or derivatives, or a multilayer film, preferably a combination of a polyethylene based copolymer film covered with an adhesive EAA layer at least at one side.

9. The automotive trim part according to claim 1, wherein the binder fibers are one of a mono-component fiber or bi-component fiber made with at least one of the following materials, polyester, in particularly polyethylene terephthalate, polyolefins, in particularly Polypropylene or polyethylene, polylactic acid (PLA) or polyamide.

10. The automotive trim part according to claim 1, wherein the recycled fibers are one of a cotton shoddy, a synthetic shoddy, a polyester shoddy, a natural fiber shoddy, or a mixed synthetic fiber and natural fiber shoddy.

11. The automotive trim part according to claim 1, wherein the self-crimped or synthetic fibers are made with at least one of the following materials polyamide (nylon) preferably polyamide 6 or polyamide 6,6, polyester and or its copolymers, preferably polyethylene terephthalate or polybutylene terephthalate, or polyolefin, preferably polypropylene or polyethylene, or made of a polymer and its copolymer.

12. The automotive trim part according to claim 1, wherein the self-crimped fibers are conjugate fibers made of at least two sides with a difference between the two sides inducing an intrinsic permanent self-crimping of the fiber in a random three-dimensional form.

13. Use of the multilayer acoustic A method of using the automotive trim part according to claim 1, as an interior trim part for instance as an inner-dash, as part of an interior flooring system, or as an inner wheel house lining or as an acoustic cladding, or as an engine bay trim part.

14. The automotive trim part according to claim 1, further comprising a covering scrim layer, an acoustic scrim layer, a decorative top layer, for instance a tufted carpet layer or nonwoven carpet layer.

15. The automotive trim part according to claim 1, wherein the mixture of fibers of the at least two fibrous layers are not in substantial contact with each other.

16. A multilayer air permeable automotive trim part for noise attenuation comprising:
- at least two fibrous layers;
- at least one of a nonwoven scrim, a hot melt layer, a gluing web, or adhesive layer between the at least two fibrous layers; and,
- wherein the at least one of the fibrous layers is a mixture of fibers consisting of 10 to 40% of binder fibers, 10 to 70% of recycled fibers and 10 to 70% of self-crimped fibers, and wherein the total amount of fibers adds to 100% by weight.

17. The automotive trim part according to claim 16, wherein the mixture of fibers of the at least two fibrous layers are not in substantial contact with each other.

* * * * *